(12) United States Patent
Fisher et al.

(10) Patent No.: US 8,078,504 B2
(45) Date of Patent: *Dec. 13, 2011

(54) METHOD AND SYSTEM FOR PROVIDING ORDER STATUS INFORMATION USING AN UPDATE STATUS FLAG

(75) Inventors: Alan S. Fisher, Pleasanton, CA (US); Samuel Jerrold Kaplan, Hillsborough, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,234

(22) Filed: Sep. 17, 2010

(65) Prior Publication Data

US 2011/0004667 A1  Jan. 6, 2011

Related U.S. Application Data

(63) Continuation of application No. 11/042,851, filed on Jan. 25, 2005, now Pat. No. 7,801,767, which is a continuation of application No. 10/371,536, filed on Feb. 14, 2003, now Pat. No. 6,859,787, which is a continuation of application No. 09/426,573, filed on Oct. 25, 1999, now Pat. No. 7,139,726, which is a continuation of application No. 08/725,635, filed on Oct. 8, 1996, now Pat. No. 6,047,264, which is a continuation-in-part of application No. 08/695,095, filed on Aug. 8, 1996, now abandoned.

(51) Int. Cl.
*G06Q 40/00* (2006.01)

(52) U.S. Cl. .................. 705/26.81; 705/26.1; 705/26.8

(58) Field of Classification Search .................... 705/26, 705/27, 26.1, 26.8, 26.81
See application file for complete search history.

(56) References Cited

U.S. PATENT DOCUMENTS

| | | | |
|---|---|---|---|
| 4,554,418 | A | 11/1985 | Toy |
| 4,766,542 | A | 8/1988 | Pilarczyk |
| 4,799,156 | A | 1/1989 | Shavit et al. |
| 4,975,841 | A | 12/1990 | Kehnemuyi et al. |
| 5,235,680 | A | 8/1993 | Bijnagte |
| 5,265,006 | A | 11/1993 | Asthana et al. |

(Continued)

FOREIGN PATENT DOCUMENTS

CA   2156907   9/1994

(Continued)

OTHER PUBLICATIONS

"U.S. Appl. No. 08/695,095, Advisory Action mailed Feb. 19, 1999", 3 pgs.

(Continued)

*Primary Examiner* — Jagdish Patel
(74) *Attorney, Agent, or Firm* — Schwegman, Lundberg & Woessner, P.A.

(57) ABSTRACT

A method and system for providing order status information using an update status flag to receive status information pertaining to an order placed by a customer with a merchant. It is determined whether the received status information is new relative to further status information pertaining to the order stored within a status record. The status record is updated to include the received status information if the received status information is new. The updated message indicating the received status information is then composed and sent to the customer.

16 Claims, 5 Drawing Sheets

U.S. PATENT DOCUMENTS

| | | | |
|---|---|---|---|
| 5,283,731 | A | 2/1994 | Lalonde et al. |
| 5,311,438 | A | 5/1994 | Sellers et al. |
| 5,313,051 | A | 5/1994 | Brigida et al. |
| 5,317,683 | A | 5/1994 | Hager et al. |
| 5,418,528 | A | 5/1995 | Hosack et al. |
| 5,428,778 | A | 6/1995 | Brookes |
| 5,485,369 | A | 1/1996 | Nicholls et al. |
| 5,487,100 | A | 1/1996 | Kane |
| 5,508,817 | A | 4/1996 | Kunigami |
| 5,548,753 | A | 8/1996 | Linstead et al. |
| 5,627,764 | A | 5/1997 | Schutzman et al. |
| 5,630,073 | A | 5/1997 | Nolan |
| 5,664,115 | A | 9/1997 | Fraser |
| 5,694,546 | A | 12/1997 | Reisman |
| 5,710,887 | A | 1/1998 | Chelliah et al. |
| 5,715,314 | A | 2/1998 | Payne et al. |
| 5,794,789 | A | 8/1998 | Payson et al. |
| 5,870,717 | A | 2/1999 | Wiecha |
| 5,960,408 | A | 9/1999 | Martin et al. |
| 6,047,264 | A | 4/2000 | Fisher et al. |
| 6,058,380 | A | 5/2000 | Anderson et al. |
| 6,151,582 | A | 11/2000 | Huang et al. |
| 6,151,643 | A | 11/2000 | Cheng et al. |
| 6,285,916 | B1 | 9/2001 | Kadaba |
| 6,735,615 | B1 * | 5/2004 | Iwayama et al. ............... 709/204 |
| 6,859,787 | B2 | 2/2005 | Fisher et al. |
| 7,110,954 | B2 | 9/2006 | Yung et al. |
| 7,130,818 | B2 | 10/2006 | Fisher et al. |
| 7,139,726 | B2 | 11/2006 | Fisher et al. |
| 7,596,510 | B2 | 9/2009 | Fisher et al. |
| 7,801,767 | B2 | 9/2010 | Fisher et al. |
| 2002/0099613 | A1 | 7/2002 | Swart et al. |
| 2002/0120533 | A1 | 8/2002 | Wiesenmaier |
| 2002/0128932 | A1 | 9/2002 | Yung et al. |
| 2003/0154134 | A1 | 8/2003 | Wang |
| 2005/0144035 | A1 | 6/2005 | Fisher et al. |
| 2005/0150951 | A1 | 7/2005 | Sacco et al. |

FOREIGN PATENT DOCUMENTS

| | | |
|---|---|---|
| CA | 2173166 | 12/1996 |
| WO | WO-9613015 A2 | 5/1996 |
| WO | WO-2005003904 A2 | 1/2005 |
| WO | WO-2005003904 A3 | 1/2005 |

OTHER PUBLICATIONS

"U.S. Appl. No. 08/695,095, Final Office Action mailed Aug. 28, 1998", 8 pgs.

"U.S. Appl. No. 08/695,095, Non Final Office Action mailed Mar. 20, 1998", 6 pgs.

"U.S. Appl. No. 08/695,095, Non-Final Office Action mailed Apr. 9, 1999", 4 pgs.

"U.S. Appl. No. 08/695,095, Response filed Jan. 8, 1999 to Final Office Action mailed Aug. 28, 1998", 15 pgs.

"U.S. Appl. No. 08/695,095, Response filed Jun. 15, 1998 to Non-Final Office Action mailed Mar. 20, 1998", 7 pgs.

"U.S. Appl. No. 08/725,635, Advisory Action mailed Feb. 11, 1999", 3 pgs.

"U.S. Appl. No. 08/725,635, Final Office Action mailed Aug. 28, 1998", 8 pgs.

"U.S. Appl. No. 08/725,635, Non-Final Office Action mailed Apr. 9, 1999", 4 pgs.

"U.S. Appl. No. 08/725,635, Non-Final Office Action mailed Apr. 15, 1998", 7 pgs.

"U.S. Appl. No. 08/725,635, Notice of Allowance mailed Aug. 13, 1999", 4 pgs.

"U.S. Appl. No. 08/725,635, Response filed Jan. 8, 1999 to Final Office Action mailed Aug. 28, 1998", 15 pgs.

"U.S. Appl. No. 08/725,635, Response filed Jun. 15, 1998 to Non-Final Office Action mailed Apr. 15, 1998", 6 pgs.

"U.S. Appl. No. 08/725,635, Response filed Jul. 13, 1999 to Non-Final Office Action mailed Apr. 9, 1999", 3 pgs.

"U.S. Appl. No. 09/426,573, Final Office Action mailed Feb. 12, 2002", 7 pgs.

"U.S. Appl. No. 09/426,573, Final Office Action mailed Apr. 22, 2003", 9 pgs.

"U.S. Appl. No. 09/426,573, Non-Final Office Action mailed Jan. 9, 2004", 7 pgs.

"U.S. Appl. No. 09/426,573, Non-Final Office Action mailed Jul. 26, 2001", 8 pgs.

"U.S. Appl. No. 09/426,573, Non-Final Office Action mailed Aug. 12, 2004", 7 pgs.

"U.S. Appl. No. 09/426,573, Non-Final Office Action mailed Oct. 28, 2002", 6 pgs.

"U.S. Appl. No. 09/426,573, Notice of Allowance mailed Jul. 28, 2006", 9 pgs.

"U.S. Appl. No. 09/426,573, Notice of Allowance mailed Oct. 4, 2005", 12 pgs.

"U.S. Appl. No. 09/426,573, Preliminary Amendment mailed Aug. 15, 2003", 6 pgs.

"U.S. Appl. No. 09/426,573, Response filed Jan. 15, 2002 to Non-Final Office Action mailed Jul. 26, 2001", 9 pgs.

"U.S. Appl. No. 09/426,573, Response filed Jan. 28, 2003 to Non-Final Office Action mailed Oct. 28, 2002", 7 pgs.

"U.S. Appl. No. 09/426,573, Response filed Apr. 9, 2004 to Non-Final Office Action mailed Jan. 9, 2004", 7 pgs.

"U.S. Appl. No. 09/426,573, Response filed Dec. 9, 2004 to Non-Final Office Action mailed Aug. 12, 2004", 9 pgs.

"U.S. Appl. No. 10/371,274, Advisory Action mailed Feb. 13, 2009", 3 pgs.

"U.S. Appl. No. 10/371,274, Examiner Interview Summary mailed Dec. 15, 2008", 3 pgs.

"U.S. Appl. No. 10/371,274, Final Office Action mailed Dec. 4, 2008", 17 pgs.

"U.S. Appl. No. 10/371,274, Non-Final Office Action mailed May 25, 2007", 7 pgs.

"U.S. Appl. No. 10/371,274, Non-Final Office Action mailed Jun. 3, 2008", 5 pgs.

"U.S. Appl. No. 10/371,274, Non-Final Office Action mailed Nov. 15, 2007", 6 pgs.

"U.S. Appl. No. 10/371,274, Notice of Allowance mailed May 6, 2009", 9 pgs.

"U.S. Appl. No. 10/371,274, Response filed Feb. 4, 2009 to Final Office Action mailed Dec. 4, 2008", 13 pgs.

"U.S. Appl. No. 10/371,274, Response filed Feb. 15, 2008 to Non-Final Office Action mailed Nov. 15, 2007", 11 pgs.

"U.S. Appl. No. 10/371,274, Response filed Aug. 27, 2007 to Non-Final Office Action mailed May 25, 2007", 10 pgs.

"U.S. Appl. No. 10/371,274, Response filed Sep. 3, 2008 to Non-Final Office Action mailed Jun. 3, 2008", 8 pgs.

"U.S. Appl. No. 10/371,296, Comments on Statement for Reasons on Allowance filed Sep. 18, 2006", 1 pg.

"U.S. Appl. No. 10/371,296, Examiner Interview Summary mailed Dec. 15, 2004", 3 pgs.

"U.S. Appl. No. 10/371,296, Final Office Action mailed Feb. 28, 2005", 11 pgs.

"U.S. Appl. No. 10/371,296, Final Office Action mailed Aug. 10, 2004", 13 pgs.

"U.S. Appl. No. 10/371,296, Non-Final Office Action mailed Jan. 16, 2004", 13 pgs.

"U.S. Appl. No. 10/371,296, Non-Final Office Action mailed Sep. 30, 2005", 5 pgs.

"U.S. Appl. No. 10/371,296, Notice of Allowance mailed Apr. 3, 2006", 11 pgs.

"U.S. Appl. No. 10/371,296, Notice of Allowance mailed Aug. 15, 2006", 9 pgs.

"U.S. Appl. No. 10/371,296, Response filed Apr. 15, 2004 to Non-Final Office Action mailed Jan. 16, 2004", 12 pgs.

"U.S. Appl. No. 10/371,296, Response filed May 9, 2005 to Final Office Action mailed Feb. 28, 2005", 11 pgs.

"U.S. Appl. No. 10/371,296, Response filed Dec. 23, 2005 to Non-Final Office Action mailed Sep. 30, 2005", 10 pgs.

"U.S. Appl. No. 10/371,536, Non-Final Office Action mailed Jan. 16, 2004", 17 pgs.

"U.S. Appl. No. 10/371,536, Notice of Allowance mailed Oct. 4, 2004", 10 pgs.

"U.S. Appl. No. 10/371,536, Response filed Jun. 9, 2004 to Non Final Office Action mailed Jan. 16, 2004", 14 pgs.
"U.S. Appl. No. 10/877,727, Advisory Action mailed Jun. 22, 2010", 2 pgs.
"U.S. Appl. No. 10/877,727, Advisory Action mailed Jun. 25, 2009", 3 pgs.
"U.S. Appl. No. 10/877,727, Final Office Action mailed Mar. 6, 2008", 10 pgs.
"U.S. Appl. No. 10/877,727, Final Office Action mailed Apr. 15, 2009", 7 pgs.
"U.S. Appl. No. 10/877,727, Final Office Action mailed Mar. 23, 2010", 10.
"U.S. Appl. No. 10/877,727, Non-Final Office Action mailed Jun. 5, 2007", 10 pgs.
"U.S. Appl. No. 10/877,727, Non-Final Office Action mailed Oct. 14, 2009", 10 pgs.
"U.S. Appl. No. 10/877,727, Non-Final Office Action mailed Oct. 20, 2008", 9 pgs.
"U.S. Appl. No. 10/877,727, Response filed Jan. 14, 2010 to Non Final Office Action mailed Oct. 14, 2009", 12 pgs.
"U.S. Appl. No. 10/877,727, Response filed Jan. 21, 2009 to Non Final Office Action mailed Oct. 20, 2008", 12 pgs.
"U.S. Appl. No. 10/877,727, Response filed Mar. 5, 2007 to Restriction Requirement mailed Dec. 5, 2006", 8 pgs.
"U.S. Appl. No. 10/877,727, Response filed Jun. 15, 2009 to Final Office Action mailed Apr. 15, 2009", 11 pgs.
"U.S. Appl. No. 10/877,727, Response filed Sep. 8, 2008 to Final Office Action mailed Mar. 6, 2008", 12 pgs.
"U.S. Appl. No. 10/877,727, Response filed Dec. 5, 2007 to Non-Final Office Action mailed Jun. 5, 2007", 16 pgs.
"U.S. Appl. No. 10/877,727, Response filed May 24, 2010 to Final Office Action mailed Mar. 23, 2010", 12 pgs.
"U.S. Appl. No. 10/877,727, Restriction Requirement mailed Dec. 5, 2006", 7 pgs.
"U.S. Appl. No. 11/042,851, Final Office Action mailed Jul. 11, 2008", 5 pgs.
"U.S. Appl. No. 11/042,851, Non-Final Office Action mailed Jan. 3, 2008", 4 pgs.
"U.S. Appl. No. 11/042,851, Non-Final Office Action mailed Mar. 2, 2009", 9 pgs.
"U.S. Appl. No. 11/042,851, Non-Final Office Action mailed Sep. 3, 2009", 10 pgs.
"U.S. Appl. No. 11/042,851, Non-Final Office Action mailed Feb. 23, 2010", 6 pgs.
"U.S. Appl. No. 11/042,851, Notice of Allowance mailed Oct. 7, 2008", 12 pgs.
"U.S. Appl. No. 11/042,851, Preliminary Amendment mailed Jan. 25, 2005", 7 pgs.
"U.S. Appl. No. 11/042,851, Response filed Mar. 17, 2008 to Non-Final Office Action mailed Jan. 3, 2008", 7 pgs.
"U.S. Appl. No. 11/042,851, Response filed Jun. 2, 2009 to Non Final Office Action mailed Mar. 2, 2009", 8 pgs.
"U.S. Appl. No. 11/042,851, Response filed Sep. 11, 2008 to Final Office Action mailed Jul. 11, 2008", 3 pgs.
"U.S. Appl. No. 11/042,851, Response filed Dec. 3, 2009 to Non Final Office Action mailed Sep. 3, 2009", 8 pgs.
"U.S. Appl. No. 11/042,851, Response filed Apr. 28, 2010 to Non Final Office Action mailed Feb. 23, 2010", 9 pgs.
"U.S. Appl. No. 11/042,851 Notice of Allowance mailed Jul. 20, 2010", 9 pgs.
"Books-Best Sellers List", http://www.nytimes.com/pages/books/bestseller/, 3 Pages.
"Businesswire, "Fed Ex Ship Delivers Shipping to the Desktop; FedEx Forms Marketing and Distribution Agreements with IBM,", Apple, Intuit, America Online and CommerceNet", (Nov. 4, 1994.).
"Buzz Index Leaders Summary", http://buzz.yahoo.com/, 2 Pages.
"Canadaian Application Serial No. 2,263,903, Office Action Mailed Mar. 12, 2009", 7 pgs.
"Canadian Application Serial No. 2263903, Non-Final Office Action mailed May 26, 2004", 7 pgs.
"Canadian Application Serial No. 2263903, Non-Final Office Action mailed Sep. 15, 2003", 5 pgs.
"Canadian Application Serial No. 2263903, Non-Final Office Action mailed Nov. 28, 2005", 6 pgs.
"Canadian Application Serial No. 2263903, Response filed Mar. 12, 2004 Non-Final Office Action mailed Sep. 15, 2003", 11 pgs.
"Electronic Mail Accounting System", Electrical Patent 5,508,817 (unknown), (Apr. 16, 1996),2139.
"European Application Serial No. 97936357.9, Non-Final Office Action mailed Jan. 8, 2005", 5 pgs.
"European Application Serial No. 97936357.9, Office action mailed Mar. 16, 2009", 4 pgs.
"Games Half.com Most Wanted", http://half.ebay.com/products/most_wanted.cfm?tag=games, 3 Pages.
"Google Zeitgeist—Search patterns, trends, and surprises according to Google", http://www.google.com/press/zeitgeist.html, 7 Pages.
"International Application Serial No. PCT/US97/13567, Written Opinion mailed Apr. 15, 1998", 8 pgs.
"International Application Serial No. PCT/US97/13567, Written Opinion mailed Jul. 29, 1998", 6 pgs.
"International Application Serial No. PCT/US 97/13567, International Search Report mailed Dec. 12, 1997", 7 pgs.
"International Application Serial No. PCT/US2004/020502, Search Report mailed Jul. 7, 2008", P220,6 pgs.
"International Application Serial No. PCT/US2004/020502, International Search Report and Written Opinion mailed Jul. 7, 2008", 11 pgs.
"Internet Watch: Advertising on the Internet Must be Useful of Entertaining If It Is To Win Over Its Audience", Marketing Week, vol. 18, No. 48, (Mar. 1, 1996),p. 16.
"Multi-Stage Parcel Tracking System", WO 96-13015A2 PCT Gazette—Section I, No. 20/1996, 7860.
"Oceanside—See What's Selling", http://www.amazon.com/exec/obidos/tg/browse/-/216306/102-84..., 4 Pages.
"Purchase Circles", http://www.amazon.com/exec/obidos/subst/community/community..., 2 Pages.
"The Billboard Hot 100", http://www.billboard.com/bb/charts/hot100.jsp, 4 Pages.
"The O.C. Party", http://50lycos.com/, 3 Pages.
"Today's Top 20 Overall Searches", http://buzz.yahoo.com/overall, 2 Pages.
Barriot, E., "From Standalone Voice Processing Applications to Call Center Solutions", Alcatel Telecommunications REview, (1995),52-57.
Boyd, Wallace, "Kodak Expands Businessland Outsourcing Pact", Computer Reseller News, No. 399, (Dec. 17, 1990),88.
Chabrow, Eric R., "Data is Part of the Package", IW, (Dec. 25, 1995),43-44.
Cox, John, "Middleware Product to Manage Transactions Over the Network", Network World, (Feb. 26, 1996),29-30.
Croft, W. B., "Task Support in an Office System", ACM Transactions on Office Information Systems, vol. 2, No. 3, (1984),197-212.
Fanderl, H , et al., "The Open Document Architecture: From Standardization to the Market", IBM System Journal, vol. 31, No. 4, (1992),728-753.
Gold, Eric, "Envoys in Electronic Mail Systems", Association for Computing Machinery, 516015, (1986),2-10.
Helinski, Paul, "Automating Web-Site Maintenance", Part 2, Perl-based tools to manage your Web site, Web Techniques, ISSN 1086-556XP002048313., www.ddj.com/architect/184414429?pgno==3>,(Dec. 1996),75-76, 78.
Holmes, Bob, "The Development of Paperless trading in Shipping", Online Publications, Electronic Data Intercharge Conference, London, (Apr. 1987),45-54.
Jacobs, April, "Oil Change Gives Automatic Software Tune-Ups", Computerworld, (May 27, 1996),29.
Kadaba, Nagesh, "Multi-Stage Parcel Tracking System", (Abstract), WO 96/13015, PCT Gazette Section 1, No. 20, (1996),7860.
Kaye, Roger A., et al., "A User Agent for Multiple Computer-Based Message Services", Computer-Based Message Services, Elsevier Science Publishers B.V., (1984),127-136.
Kennedy, Randall, "Automatic Delivery For Interoffice Forms: JetForm for E-Mail 3.10", Windows Source, vol. 1, No. 7, (Aug. 1993),p. 154.

Kunigami, Toshio, "Electronic Mail Accounting System", USPN5,508,817, *Official Gazette of the U.S. Patent and Trademark Office*, (Apr. 16, 1996),2139.

Lamotte, J., "Getting the Most Out of Mail-Enabled Applications", *Managing Office Technology*, vol. 39, No. 4, (Mar. 1994),p. 73.

M2 Presswire, "Intersolv's PVCS Tracker Helps Corporate UK Achieve More From Its Web Sites", (Aug. 28, 1996),3 pages.

Mayer, C., "The Washington Post", *Visa settles Suit Over Debit Cards: Firm to Lower Fees, Pay Stores $2 Billion*, (05/012003),E.01.

McKie, Stewart, "Internet—DBMS Strategies", *DBMS*, vol. 9, No. 11,(Oct. 1996),44-46, 50, 52.

Moore, R. E, "Utilizing the SNA Alert in the Management of Multivendor Networks", *IBM Systems Journal*, vol. 27, No. 1, (1988),15-30.

Nash, Kim, "Vendors Delivers IS-Specific Apps Over the Net", *Computerworld*, (May 6, 1996),p. 16.

News Release, "Beyond Text-Search: New System for Online Product Catalogs Enables Precise", *Rapid Search, Comparison & Selection Via Product Attributes*, (May 6, 1996),4 pages.

Oberndorf, Shannon, "Online Transaction Come Full Circle", *Catalog Age*, vol. 13, No. 13, (Dec. 1996),p. 10.

Payne, Judith, "Electronic Data Interchange (EDI) Using Electronic Commerce to Enhance Defense Logistics", *R-4030-P&L, Rand*, (1991),42-54.

PR Newswire Article, "Dell Launches Internet Computer Store", *Dialog(R)File 649:Gale Group Newswire ASAP(TM)*, (Jul. 22, 1996),3 Pages.

PR Newswire Article, "FedEx Ship Delivers Shipping to the Desktop", (Nov. 2, 1994),3 pages.

Rhine, Lenny, "Journal Claiming Via Electronic Mail", *Computers in Libraries*, (34),Jun. 1989.

Robinson, Brian, "Windows-Based EC Front End Debuts, (MACA's Electronic Procurement Systems 4.0)", *Federal Computer Week*, (Abstract), vol. 8, No. 31, (Oct. 24, 1994),32

Rockoff, Maxine, "Distributed Brokerage Offices Through Information Technology", *ACM Conference on Organizational Computing Systems*, (1991),165-170.

Saeki, Motoshi, "Supporting Distributed Individual Work in Cooperative Specification Development", *Dept. of Computer Science, Tokyo Institute of Technology*, (Nov. 15, 1995),232-247.

Search Report, "International Searching Authority", PCT/US 97/13567, (Jul. 31, 1997).

Srinivasan, Kannan, et al., "Impact of Electronic Data Intercharge Technology on JIT Shipments", *Management Science*, vol. 40, No. 10, (Oct. 1994),1291-1304.

Stecher, P, "Building Business and Application Systems with the Retoil Application Architecture", *IBM Systems Journal*, vol. 32, No. 2, (1993),278-306.

Steele, Ken, "The Standardisation of Flexible EDI Messages", *Chapter 3, Electronic Commerce, Current Research Issues and Applications*, (Nov. 24, 1994),13-26.

Teixeira, D., "As Issuers Gather Addresses, Their E-mail Usage Will Grow", *American banker*, vol. 168, Iss 15, (Jan. 23, 2003), 13 pgs.

Towle, Henry, "On the Fast Track With Total Track: UPS Deploys Mobile Data Service", *Documents Delivery World*, vol. 9, No. 9, (1993),30-31.

Underwood, Chris, "A Mulitple Round Ascending Auction Process Suitable for the Disposal of Radio Spectrum in New Zealand", (Jan. 17, 1996).

Wallace, Boyd, "Kodak Expands Businessland Outsourcing Pact", *Computer Reseller News*, No. 399, (1993),p. 88.

Wilson, Paul, "Structures for.Mailbox System Applications", *Computer-Based Message Services, Elsevier Science Publishers B.V.*, (1984),149-165.

"European Application Serial No. 97936357.9, Summons to Attend Oral Proceedings mailed Oct. 15, 2010", 5 pgs.

"European Application Serial No. 97936357.9, Written Submission/ Documents Filed Nov. 16, 2010", 6 pgs.

* cited by examiner

METHOD AND SYSTEM FOR PROVIDING ORDER STATUS INFORMATION USING AN UPDATE STATUS FLAG

CROSS-REFERENCE TO RELATED APPLICATIONS

This application is a continuation of U.S. application Ser. No. 11/042,851 filed Jan. 25, 2005, now issued as U.S. Pat. No. 7,801,767, which is a continuation of U.S. application Ser. No. 10/371,536, filed Feb. 14, 2003, now U.S. Pat. No. 6,859,787 which is a continuation of U.S. application Ser. No. 09/426,573, filed Oct. 25, 1999, now U.S. Pat. No. 7,139,726 which is a continuation of U.S. application Ser. No. 08/725,635, filed Oct. 8, 1996, now issued as U.S. Pat. No. 6,047,264, which is a continuation-in-part of U.S. patent application Ser. No. 08/695,095, filed Aug. 8, 1996, now abandoned.

This application is related to copending patent application Ser. No. 10/371,274, entitled "Method and System for Requesting Status Information from a Common Carrier," filed Feb. 14, 2003 and patent application Ser. No. 10/371,296, entitled "Method and System for Providing Order Status Information using a Network Address," filed Feb. 14, 2003, each commonly assigned with the present invention.

BACKGROUND OF THE INVENTION

1. Field of the Invention

The present invention relates generally to electronic commerce and more particularly to updating customers as to the status of their orders and order shipments.

2. Description of the Related Art

In the mail order industry, it is common practice to notify customers by mail when their orders are backlogged or their shipments will be delayed for some reason. The advent of wide area electronic networks like the Internet has made it possible for customers to query the status of their orders and shipments by directly accessing the merchants' and shippers' information systems. For example, both Federal Express® (FedEx®) and United Parcel Service® (UPS®) have world wide web sites on the Internet where customers can track the shipping status of their packages by simply inputting the package's tracking number to a computer form on a web page.

There is an advantage however, to notifying customers by mail when their shipments will be delayed, because the customer is not required to take any action to receive this notification—that is, the customer does not have to proactively access the Internet or other network, go to the shipper's world wide web site, and obtain and input a parcel tracking number in order to check on the shipping status.

In U.S. Pat. No. 5,428,778 to Brookes ("Brookes"), a keyword based profile is used to match information coming into a system with the users' interests. In Brookes, the user is alerted to the presence of the information in the database (perhaps because there is a delivery fee associated with the information), but the information is not actually delivered to the user.

Also in the related art are several Internet-based electronic mail systems that deliver information to users daily via E-mail based on personal profiles. There are, for example, several stock quotation services that electronically mail a list of a user's personal favorite stock prices each day. Unlike Brookes, such systems do deliver the information directly to the user. However, the user is required to submit an interest profile to the system in order to receive feedback.

There is a need in the art, therefore, for a system and method for automatically notifying a party of the status of a delivery without requiring submission of a status request or special profile information from the party.

SUMMARY OF THE INVENTION

A method and system for providing order status information using an update status flag is described. According to one aspect of the invention, status information pertaining to an order placed by a customer with a merchant is received. It is determined whether the received status information is new relative to further status information pertaining to the order stored within a status record. The status record is updated to include the received status information if the received status information is new. The updated message indicating the received status information is then composed and sent to the customer.

BRIEF DESCRIPTION OF THE DRAWINGS

The aforementioned advantages of the invention, as well as additional advantages thereof, will be more fully understood as a result of a detailed description of the exemplary embodiment when taken in conjunction with the accompanying drawings in which.

DETAILED DESCRIPTION OF AN EXEMPLARY EMBODIMENT

Figure 1:
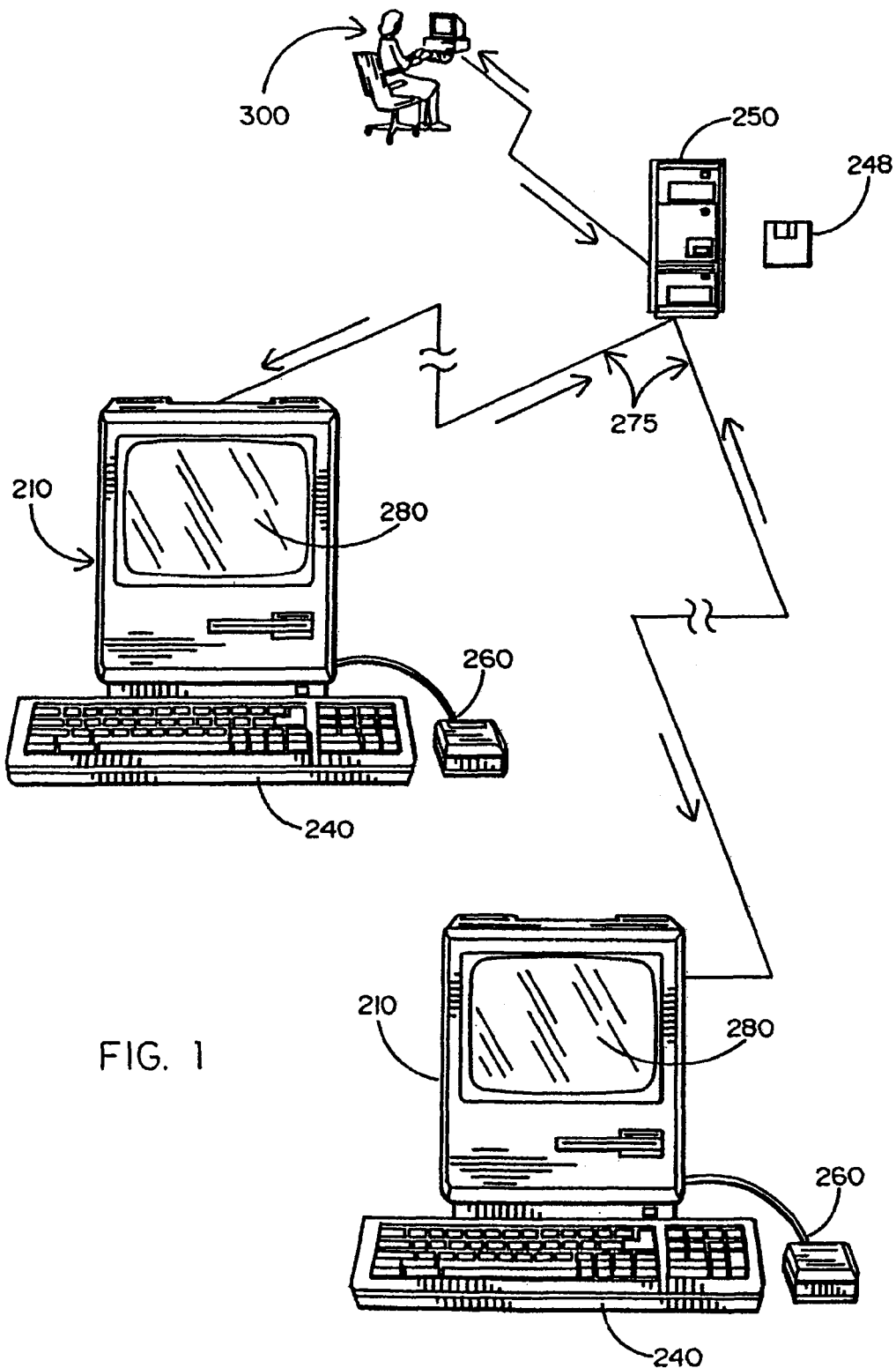
FIG. 1 illustrates an exemplary computer environment for implementing the system and method of the present invention.

The present invention may be implemented as a computer program 248 running on a central server host computer shown in FIG. 1, attached to a wide area network 275 accessible by many potential customers through remote terminals 210 using keyboard 240, pointing device 260 and monitor 280. An exemplary network for implementing the present invention is the Internet which is accessible by a significant percentage of the world population, although the network may also be a local area or limited area accessible network.

Figure 2:
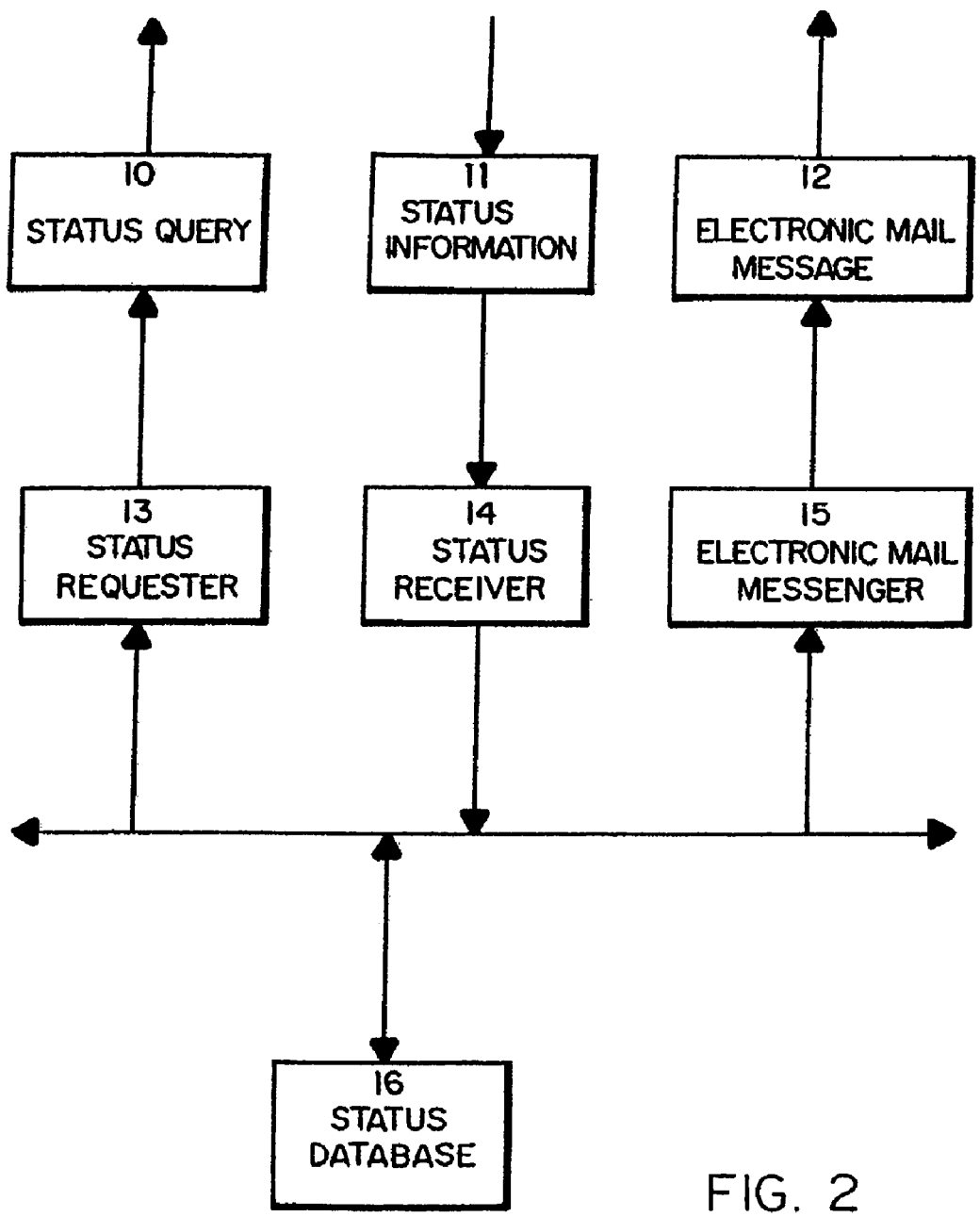
FIG. 2 is block diagram of components illustrating an exemplary embodiment of the present invention.

Information about the customers and their respective orders is maintained in a status database 16 such as the one shown in FIG. 2. Status database 16 may be maintained on server 250 shown in FIG. 1. Individual customer orders may be placed in this database either by order entry personnel 300 or electronically by order entry systems also attached to wide area network 275 of FIG. 1. Status information in status database 16 maybe updated manually by order entry personnel or electronically by other means such as status receiver 14 shown in FIG. 2.

Periodically via status query 10, status requester 13, sends a status request to another host computer on wide area network 275, such as a common carrier shipping service like UPS® or FedEx®. Status information 11 is returned and received by status receiver 14, which places the new status information in status database 16. When status receiver 14 updates the status in status database 16, it sets a flag on the particular database record indicating a change in status.

Periodically, electronic mail messenger 15 checks status database 16, to see if the status of any record has changed, by examining the records, status flags. If a record has been flagged, then electronic mail messenger 15 composes an electronic mail message 12 based on the new status information in status database 16. This electronic mail message 12 is transmitted to the customer over the wide area network 275.

Figure 3:
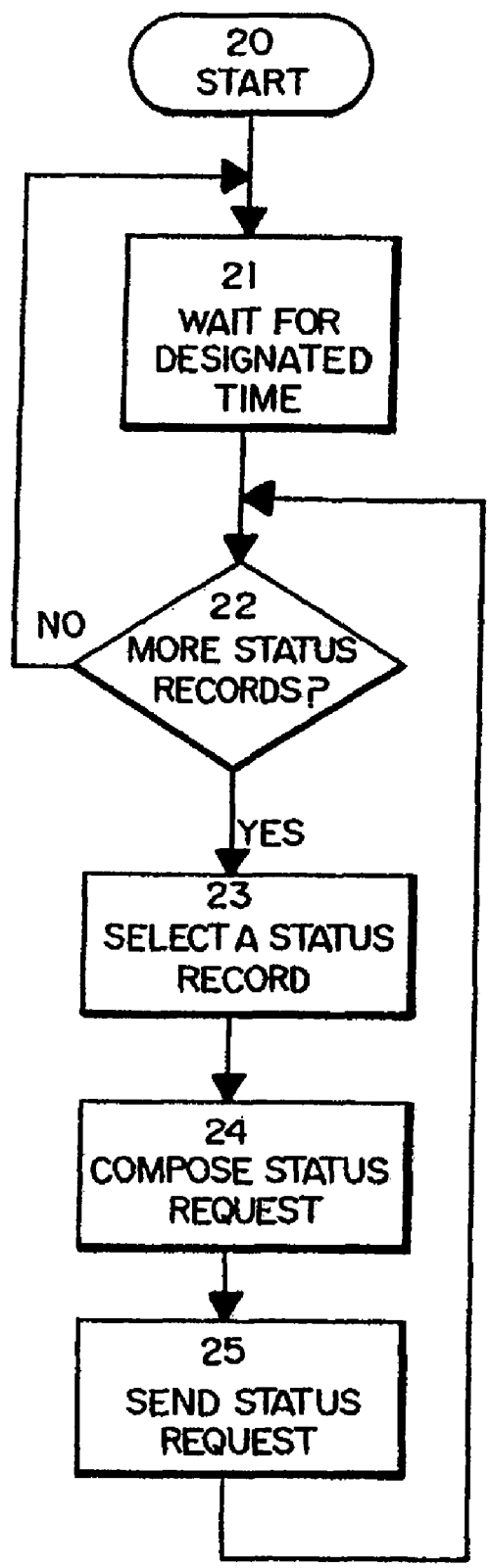
FIG. 3 is a flowchart illustrating the status requester and its method of operation.

FIG. 3 illustrates the operation of status requester 13. In an exemplary embodiment, the status requester is continually running a program that periodically requests status updates from other host computers on wide area network 275. After waiting 21 for a designated time, which for a shipping status update is preferably every six to twenty-four hours, status database 16 is checked 22 to see if there are more status records. If so, then a status record is selected 23 and a status request is composed 24. This status request is sent 25 to another host computer on wide area network 275. This requesting process continues until each of the status records in status database 16 have been checked 22.

Figure 4:
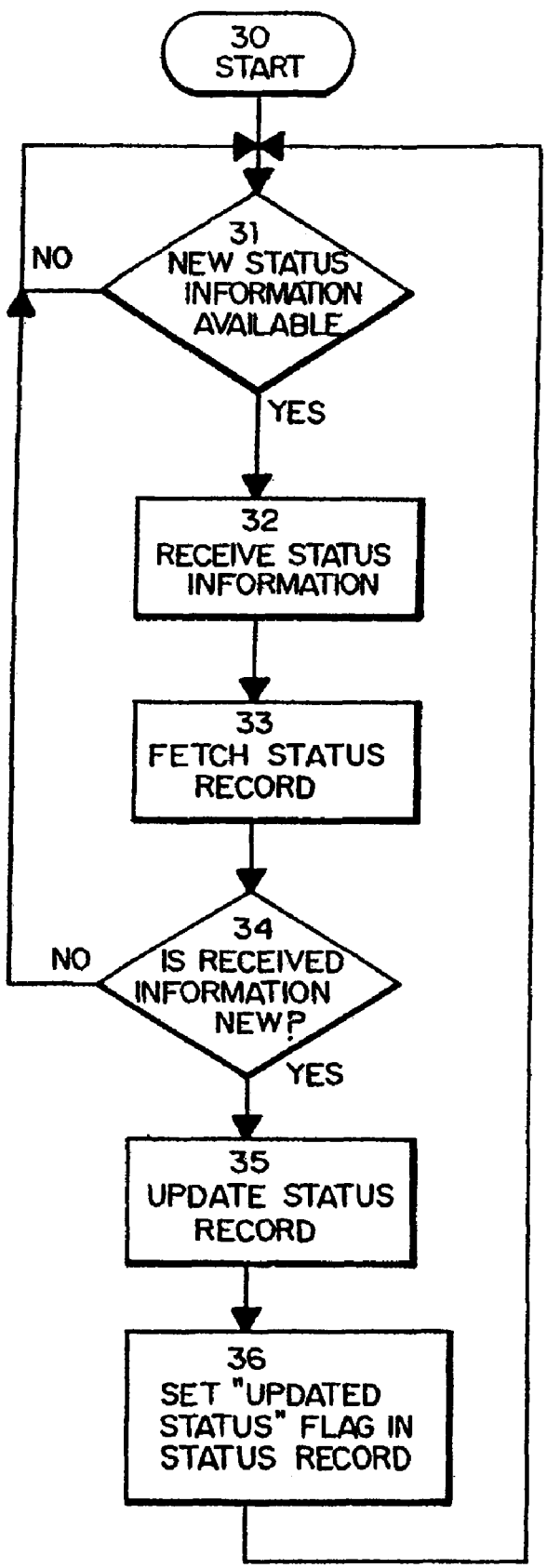
FIG. 4 is a flowchart illustrating the status receiver and its method of operation.

FIG. 4 illustrates the operation of status receiver 14. In the exemplary embodiment, the status receiver is a continually running program that periodically receives status information 11 from another host computer on wide area network 275 based on requests generated by status requester 13. Wide area network 275 is continually checked for new status information 11. If new status information is found available at 31 then the status information is received 32 and the corresponding status record is fetched 33 from status database 16. The information is compared with that in the status record to determine 34 if the received information is new. If the received information is new, then the status record is updated 35 in status database 16 and the Updated Status flag is set 36 in the status record.

Figure 5:
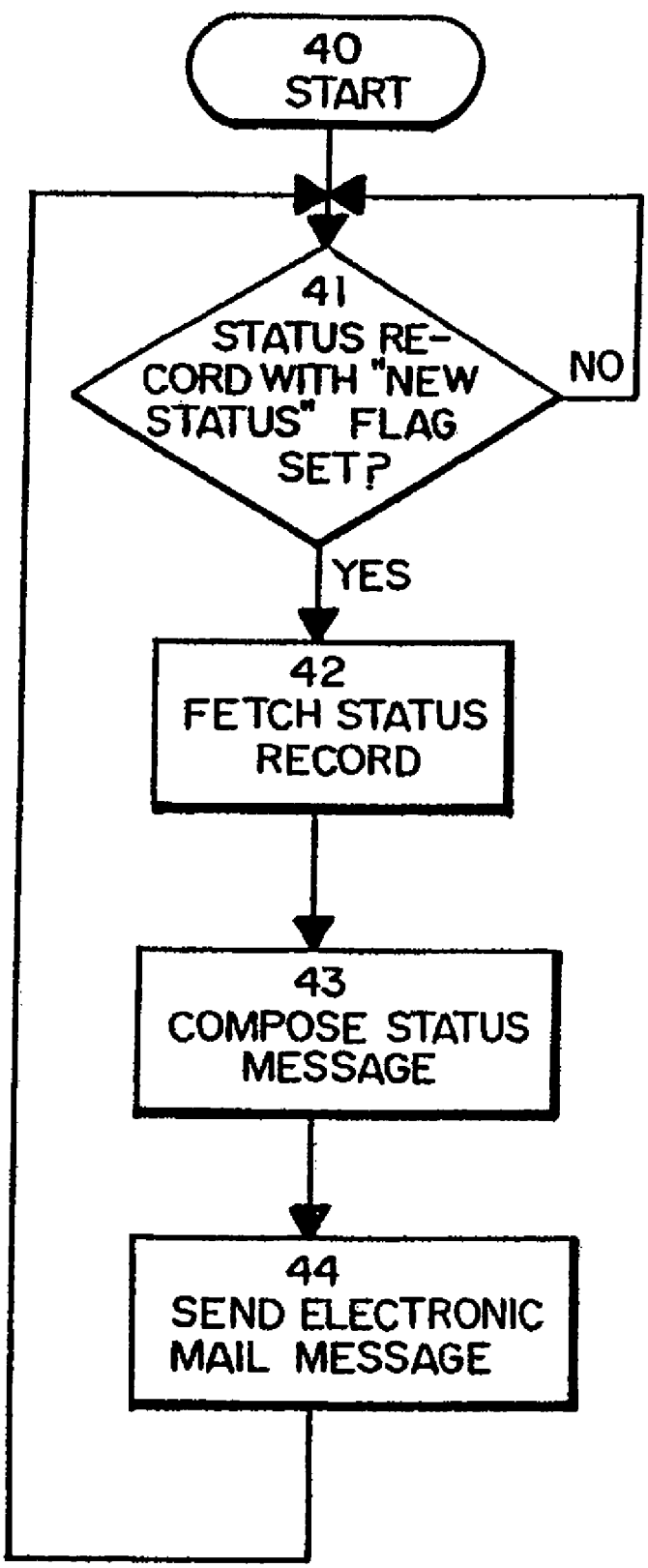
FIG. 5 is a flowchart illustrating the electronic mail messenger and its method or operation.

FIG. 5 illustrates the operation of electronic mail messenger 15. In an exemplary embodiment, the electronic mail messenger is a continually running program that periodically checks 41 status database 16 to see if any records have an "Updated Status" flag set. If so, the appropriate status record is fetched 42 from status database 16 and an electronic mail message is composed 43 regarding the new status information. This electronic mail message is then preferably sent 44 to the recipient over wide area network 275.

One skilled in the art to which the present invention pertains will recognize that the various components of the system may communicate between themselves in a variety of ways. In an exemplary embodiment, status receiver 14 signals electronic mail messenger 15 via an "Updated Status" flag in the appropriate database records that a new update message should be sent. However, status receiver 14 could directly communicate with electronic mail messenger 15 to send a status update message without setting a signaling flag in status database 16 and awaiting discovery of such a flag by the electronic mail messenger.

One skilled in the art to which the present invention pertains will further recognize that components of status requester 13 and status receiver 14 may be combined into a single module that communicates with a remote host computer in a synchronous fashion. For example, the status requester portion of the combined module could send a status request to the remote host computer and wait for the status information to be received before proceeding to submit the next status request to the remote host computer. This type of synchronous operation is quite common in electronic data interchange applications.

The present invention may be implemented as a software program on a host computer such as 250 in FIG. 1 within a network 275 such as the Internet. The program may be loaded onto computer 250 from disk 248 or a similar storage medium.

A general description of the present invention as well as an exemplary embodiment of the present invention has been set forth above. Those skilled in the art to which the present invention pertains will recognize and be able to practice additional variations to the methods and system described within the teachings of this invention. Accordingly, all such modifications and additions are deemed to be within the scope of the invention, which is to be limited only by the appended claims.

What is claimed is:

1. A method of providing a notification service, the method comprising:
    receiving, at a server computer, status information relevant to an order;
    determining, using a processor, an order status of the order based on the status information;
    updating an order record for the order with the status information;
    automatically generating a message containing the order status; and
    transmitting, over a network, the message to a user of the notification service.

2. The method of claim 1 further comprising requesting the status information.

3. The method of claim 1 further comprising storing the status information in a status database.

4. The method of claim 1 further comprising:
    periodically determining that the status information has been updated, and
    generating the message containing the order status in response to the status information having been updated.

5. The method of claim 1 wherein the status information includes information regarding a shipping status of the order.

6. A system for providing a notification service, the system comprising:
    a status receiver to receive status information relevant to an order;
    a status requester to determine an order status of the order based on the status information;
    a status updater to update an order record for the order with the status information; and
    a messenger module to automatically generate a message containing the order status and to transmit, over a network, the message to a user of the notification service.

7. The system of claim 6 wherein the status requester is to request the status information.

8. The system of claim 6 further comprising a status database to store the status information.

9. The system of claim 6 wherein the messenger module is to:
    periodically determine that the status information associated with the order has been updated, and
    generate the message containing the order status in response to the status information having been updated.

10. The system of claim 6 wherein the status information includes information regarding a shipping status of the order.

11. A non-transitory machine-readable medium having executable instructions to cause a machine to perform a method to provide update information, the method comprising:
    receiving, at a server computer, status information relevant to an order;

determining an order status of the order based on the status information;

updating an order record for the order with the status information;

automatically generating a message containing the order status; and transmitting, over a network, the message to a user of the notification service.

12. The machine-readable medium of claim 11, the method further comprising requesting the status information.

13. The machine readable medium of claim 11, the method further comprising storing the status information in a status database.

14. The machine-readable medium of claim 11, the method further comprising:

periodically determining that the status information has been updated, and generating the message containing the order status in response to the status information having been updated.

15. The machine-readable medium of claim 11 wherein the status information includes information regarding a shipping status of the order.

16. A system comprising:

a first means for receiving, at a server computer, status information relevant to an order;

a second means for determining an order status of the order based on the status information, a third means for updating an order record for the order with the status information; and a fourth means for automatically generating a message containing the order status and for transmitting the message to a user of the notification service, over a network.

* * * * *

UNITED STATES PATENT AND TRADEMARK OFFICE
CERTIFICATE OF CORRECTION

PATENT NO. : 8,078,504 B2  
APPLICATION NO. : 12/885234  
DATED : December 13, 2011  
INVENTOR(S) : Alan S. Fisher et al.

Page 1 of 1

It is certified that error appears in the above-identified patent and that said Letters Patent is hereby corrected as shown below:

On the Title Page

On page 3, under "Other Publications", in column 1, line 67, delete ""Canadaian" and insert -- "Canadian --, therefor.

On page 3, under "Other Publications", in column 2, line 61, delete "Intercharge" and insert -- Interchange --, therefor.

On page 4, under "Other Publications", in column 2, line 9, delete "Intercharge" and insert -- Interchange --, therefor.

On page 4, under "Other Publications", in column 2, line 13, delete "Retoil" and insert -- Retail --, therefor.

On page 4, under "Other Publications", in column 2, line 23, delete "Mulitple" and insert -- Multiple --, therefor.

On page 4, under "Other Publications", in column 2, line 28, delete "for." and insert -- for --, therefor.

In the Claims

In column 5, line 11, in Claim 13, delete "machine readable" and insert -- machine-readable --, therefor.

In column 6, line 10, in Claim 16, delete "information," and insert -- information; --, therefor.

Signed and Sealed this  
Twenty-ninth Day of September, 2015

Michelle K. Lee  
*Director of the United States Patent and Trademark Office*